W. A. SOUERS.
AUTOMATIC WATER VALVE.
APPLICATION FILED OCT. 6, 1915.

1,213,033.

Patented Jan. 16, 1917.

Witnesses
John D. Spalding
J. W. Garner

Inventor
W. A. Souers
By Victor J. Evans
Attorney

UNITED STATES PATENT OFFICE.

WILLIAM A. SOUERS, OF JOHNSTON CITY, ILLINOIS.

AUTOMATIC WATER-VALVE.

1,213,033.

Specification of Letters Patent.  Patented Jan. 16, 1917.

Application filed October 6, 1915. Serial No. 54,419.

*To all whom it may concern:*

Be it known that I, WILLIAM A. SOUERS, a citizen of the United States, residing at Johnston City, in the county of Williamson and State of Illinois, have invented new and useful Improvements in Automatic Water-Valves, of which the following is a specification.

This invention relates to improvements in valves for use on hot water radiators and in connection with hot water systems generally, one object of the invention being to provide an improved valve of this character which operates automatically and allows the escape of all air but no water from the radiator, another object being to provide an improved valve of this character which is extremely cheap and simple, requires practically no attention, and is not likely to get out of order.

The invention consists in the construction, combination and arrangement of devices hereinafter described and claimed.

Figure 1:
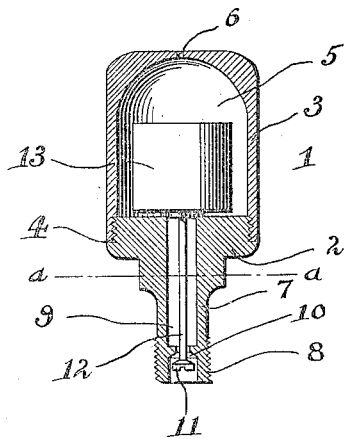
Figure 2:
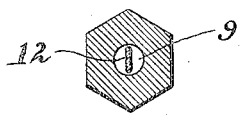

In the accompanying drawings:—Figure 1 is a vertical central sectional view of a valve constructed in accordance with my invention. Fig. 2 is a detail sectional view of the same on the plane indicated by the line *a—a* of Fig. 1.

The valve casing 1 comprises a base 2, and a cap 3 which is screwed to the base as at 4 and is formed with a chamber 5. In the upper end of the cap is an air escape opening 6. The base is provided with a downwardly extending tubular stem or nipple 7, threaded at its lower end as at 8, for engagement with a threaded opening in a radiator or other hot water system element and for the attachment of the valve thereto. This stem or nipple is provided with a bore 9 and with a valve seat 10 near the lower, inner end of said bore, the bore extending up entirely through the base and communicating with the chamber 5 in the cap.

A valve 11 is arranged for operation in the lower portion of the bore and to close upwardly against the valve seat 10 and is provided with a non-circular stem 12 the width of which is less than the diameter of the bore and which extends upwardly through the bore. A float 13 of suitable construction is arranged in the chamber 5 and is secured to the upper end of the valve stem.

In the operation of my device, air in passing out of the radiator passes through the bore 9 on either side of the valve stem 12, filling the air chamber 5 and then passing out at the vent opening 6. This opening being very much smaller than the bore 9 serves to keep the air chamber 5 full of air all the time while the air is passing out of the radiator. The valve 11 remains in lowered opened position until water enters the bowl 9 at 10 and comes in contact with the bottom of the float 13. This causes the valve 11 to be raised by the float and to close in the seat 10, thus shutting off the further flow of water and there is nothing more for the air vent 6 to do as the air has passed out and the water is shut off by the valve. When the system is to be emptied, the pressure is relieved by opening a valve in the basement, thus causing the float 13 to drop and reopen the valve 10 and thereby admitting air in the vent 6 and causing the water to run quickly out of the radiator. The water never reaches the vent 6 as the valve closes as soon as water comes in contact with the flow 13 and hence nothing but air passes through the vent 6.

Having thus described my invention, I claim:—

The herein described valve for use in connection with a hot water system and comprising a casing having a cap and a base, said cap being formed with a chamber and being provided with a minute constantly open air escape opening leading therefrom, the said base having a downwardly extending nipple stem provided with a bore extending therethrough and with a valve seat near its lower end, the capacity of the said bore exceeding that of said air escape opening, in combination with a valve to close upwardly against the valve seat and having an upwardly extending stem only partly filling and loosely arranged and for vertical movement in the bore, and a float at the upper end of the stem and attached thereto and arranged above the base and in the chamber of the cap, said float, when at the lower limit of its movement, causing the valve to open downwardly from the valve seat.

In testimony whereof I affix my signature in presence of two witnesses.

WILLIAM A. SOUERS.

Witnesses:
 E. SLATON,
 D. B. HARMON.

Copies of this patent may be obtained for five cents each, by addressing the "Commissioner of Patents, Washington, D. C."